United States Patent
Chu et al.

(10) Patent No.: US 10,522,062 B2
(45) Date of Patent: Dec. 31, 2019

(54) THREE-DIMENSIONAL DISPLAY MODULE

(71) Applicant: Industrial Technology Research Institute, Hsinchu (TW)

(72) Inventors: Ying-Chien Chu, Tainan (TW); Yen-Hsiang Fang, New Taipei (TW); Chia-Hsin Chao, Hsinchu County (TW); Ming-Hsien Wu, Tainan (TW); Shih-Hao Wang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 484 days.

(21) Appl. No.: 15/372,409

(22) Filed: Dec. 8, 2016

(65) Prior Publication Data

US 2018/0108284 A1  Apr. 19, 2018

(30) Foreign Application Priority Data

Oct. 13, 2016 (TW) .............................. 105133006 A

(51) Int. Cl.
*G09G 3/00* (2006.01)
*G02B 27/01* (2006.01)
(Continued)

(52) U.S. Cl.
CPC ......... *G09G 3/003* (2013.01); *G02B 27/0101* (2013.01); *G02F 1/137* (2013.01);
(Continued)

(58) Field of Classification Search
CPC ...... G09G 3/003; G09G 3/3413; G09G 3/342; G09G 3/36; G09G 2300/0426;
(Continued)

(56) References Cited

U.S. PATENT DOCUMENTS

| | | | |
|---|---|---|---|
| 5,091,757 A | * | 2/1992 | Yoshida ..................... B41J 2/45 257/93 |
| 8,446,339 B2 | | 5/2013 | Tomisawa et al. |

(Continued)

FOREIGN PATENT DOCUMENTS

| | | |
|---|---|---|
| CN | 103917913 | 7/2014 |
| CN | 105242405 | 1/2016 |

(Continued)

OTHER PUBLICATIONS

"Office Action of Taiwan Counterpart Application," dated Mar. 21, 2017, p. 1-p. 5, in which the listed references were cited.

*Primary Examiner* — Nitin Patel
*Assistant Examiner* — Amy Onyekaba
(74) *Attorney, Agent, or Firm* — JCIPRNET

(57) ABSTRACT

A three-dimensional display module includes a substrate, a display layer, a first electrode layer, a liquid-crystal layer, a second electrode layer, and a drive unit. The substrate has first electrodes and second electrodes. The display layer is disposed on the substrate and includes light-emitting elements. The first electrode layer is disposed on the display layer. The liquid-crystal layer is disposed on the display layer. The second electrode layer is disposed on the liquid-crystal layer. The drive unit drives the first electrodes and the first electrode layer to supply power to the light-emitting elements, such that the light-emitting elements generate light passing through the liquid-crystal layer to form a display image. The drive unit drives the second electrodes and the second electrode layer to produce an electric field on the liquid-crystal layer to change focal length of the liquid-crystal layer so as to control depth of field of the display image.

9 Claims, 5 Drawing Sheets

(51) Int. Cl.
  *G02F 1/1343*  (2006.01)
  *G02F 1/137*   (2006.01)
  *G06T 19/00*   (2011.01)
  *G09G 3/34*    (2006.01)
  *G09G 3/36*    (2006.01)

(52) U.S. Cl.
  CPC ...... *G02F 1/134309* (2013.01); *G06T 19/006* (2013.01); *G09G 3/342* (2013.01); *G09G 3/3413* (2013.01); *G09G 3/36* (2013.01); *G02B 2027/0127* (2013.01); *G06T 2219/004* (2013.01); *G09G 2300/0426* (2013.01); *G09G 2380/10* (2013.01)

(58) Field of Classification Search
  CPC .............. G09G 2380/10; G06T 19/006; G06T 2219/004; G02B 2027/0134; G02B 27/01; G02B 27/017; G02B 27/22; G02B 27/0101; G02B 2027/0127; G02F 1/1313; G02F 1/1343; G02F 1/134309; G02F 1/137; G02F 2001/294; G02F 1/29
  See application file for complete search history.

(56) References Cited

U.S. PATENT DOCUMENTS

| | | | |
|---|---|---|---|
| 2004/0036829 A1* | 2/2004 | Sugimoto | G02F 1/31 349/141 |
| 2006/0193629 A1* | 8/2006 | Ootsuka | G02F 1/1313 396/457 |
| 2006/0273284 A1* | 12/2006 | Hirose | G02B 3/14 252/299.61 |
| 2008/0218459 A1* | 9/2008 | Kim | G02F 1/1323 345/87 |
| 2011/0205470 A1* | 8/2011 | Kim | H01L 27/3232 349/96 |
| 2013/0148075 A1* | 6/2013 | Sheu | G02F 1/1334 349/200 |
| 2013/0248850 A1* | 9/2013 | Choi | H01L 29/66969 257/43 |
| 2013/0286053 A1 | 10/2013 | Fleck et al. | |
| 2014/0184751 A1* | 7/2014 | Liou | H04N 13/239 348/47 |
| 2014/0240303 A1* | 8/2014 | Chiang | G09G 3/003 345/212 |
| 2015/0130751 A1* | 5/2015 | Teraguchi | H04N 13/305 345/174 |
| 2017/0064291 A1* | 3/2017 | Do | G09G 3/2003 |
| 2017/0315374 A1* | 11/2017 | Zhou | G02F 1/1343 |

FOREIGN PATENT DOCUMENTS

| | | |
|---|---|---|
| TW | 201227942 | 7/2012 |
| TW | I407221 | 9/2013 |
| TW | 201421131 | 6/2014 |
| TW | 201630179 | 8/2016 |
| TW | M526692 | 8/2016 |

* cited by examiner

THREE-DIMENSIONAL DISPLAY MODULE

CROSS-REFERENCE TO RELATED APPLICATION

This application claims the priority benefit of Taiwan application serial no. 105133006, filed on Oct. 13, 2016. The entirety of the above-mentioned patent application is hereby incorporated by reference herein and made a part of this specification.

TECHNICAL FIELD

The disclosure relates to a display module, and more particularly, to a three-dimensional display module.

BACKGROUND

The heads-up display (HUD) is an auxiliary display currently widely used in aircrafts and cars that project vehicle status information such as vehicle speed, engine RPM (revolution per minute), engine water temperature, whether the doors are closed, mileage, and fuel consumption on the windshield for the driver.

With the progress in three-dimension display techniques, the augmented-reality HUD (AR-HUD) has been developed, which produces virtual images in the environment outside the windshield to form labels corresponding to the real roads via the virtual images such that the driver can see the information displayed by the HUD by looking directly ahead at the real roads. As a result, safety and convenience of the driver are increased. However, if the AR-HUD cannot rapidly and accurately control the depth of field of the display image thereof, then labeling cannot be effectively performed under the constantly changing traffic conditions while driving.

SUMMARY

The disclosure provides a three-dimensional display module that can rapidly and accurately control the depth of field of the display image thereof.

The three-dimensional display module of the disclosure includes a substrate, a display layer, a first electrode layer, a liquid-crystal layer, a second electrode layer, and a drive unit. The substrate has a plurality of first electrodes and a plurality of second electrodes. The display layer is disposed on the substrate and includes a plurality of light-emitting elements. The light-emitting elements are respectively connected to the first electrodes. The first electrode layer is disposed on the display layer and connected to the light-emitting elements. The liquid-crystal layer is disposed on the display layer and covers the first electrode layer. The second electrode layer is disposed on the liquid-crystal layer. The drive unit drives each of the first electrodes and the first electrode layer to provide power to each of the light-emitting elements such that the light-emitting elements emit light passing through the liquid-crystal layer to form a display image, and the drive unit drives each of the second electrodes and the second electrode layer to produce an electric field at the liquid-crystal layer to change the focal length of the liquid-crystal layer so as to control the depth of field of the display image.

The three-dimensional display module of the disclosure includes a substrate, a plurality of conductive structures, a plurality of light-emitting elements, a liquid-crystal layer, and at least one drive unit. The conductive structures are disposed on the substrate and respectively have different heights. The light-emitting elements are respectively disposed on the conductive structures. The liquid-crystal layer is disposed on the light-emitting elements. The drive unit drives each of the light-emitting elements such that the light-emitting elements emit light passing through the liquid-crystal layer to form a display image, and the drive unit produces an electric field at the liquid-crystal layer to change the focal length of the liquid-crystal layer so as to control the depth of field of the display image.

Based on the above, in the disclosure, the plurality of light-emitting elements producing the display image and the liquid-crystal layer adjusting the depth of field of the display screen are integrated in the three-dimensional display module. In addition to driving the light-emitting elements to emit light to produce the display image, the drive unit of the three-dimensional display module can also drive the liquid-crystal layer to change the focal length thereof to rapidly and accurately control the depth of field of the display image for effective labeling under the constantly changing traffic conditions while driving.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
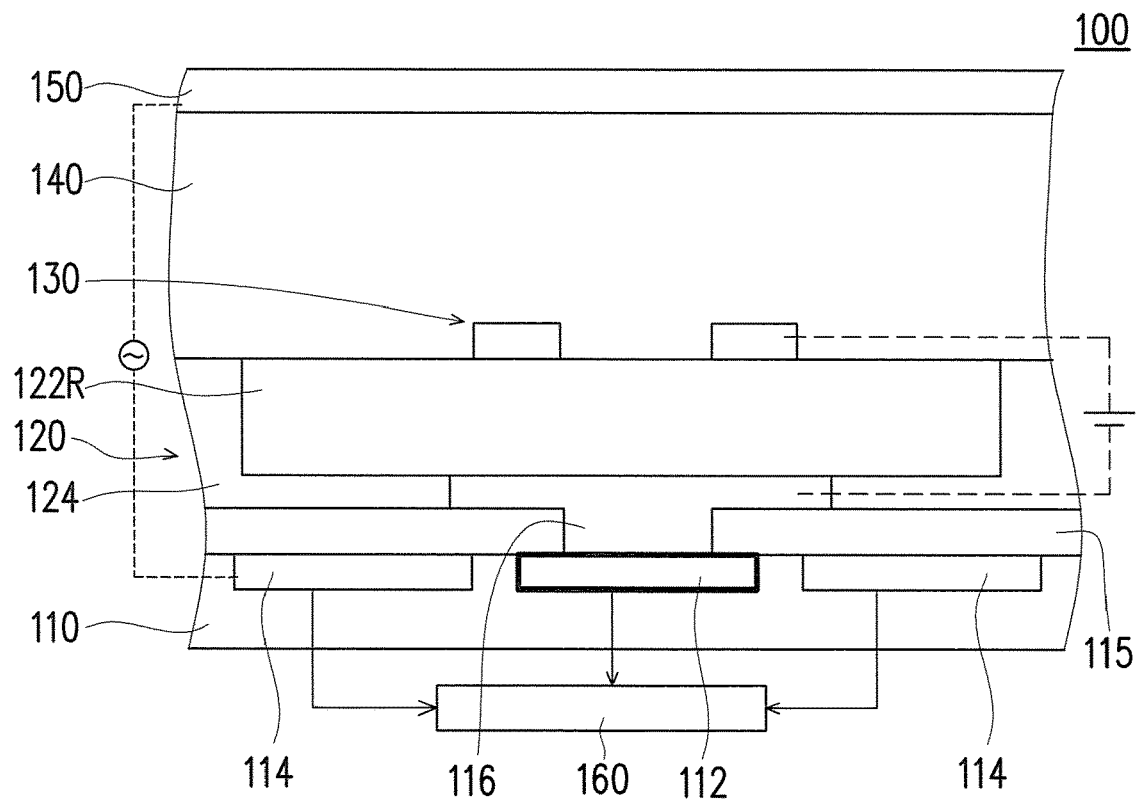
FIG. 1 is a cross-sectional schematic of a portion of the three-dimensional display module of an embodiment of the disclosure.
Figure 2:
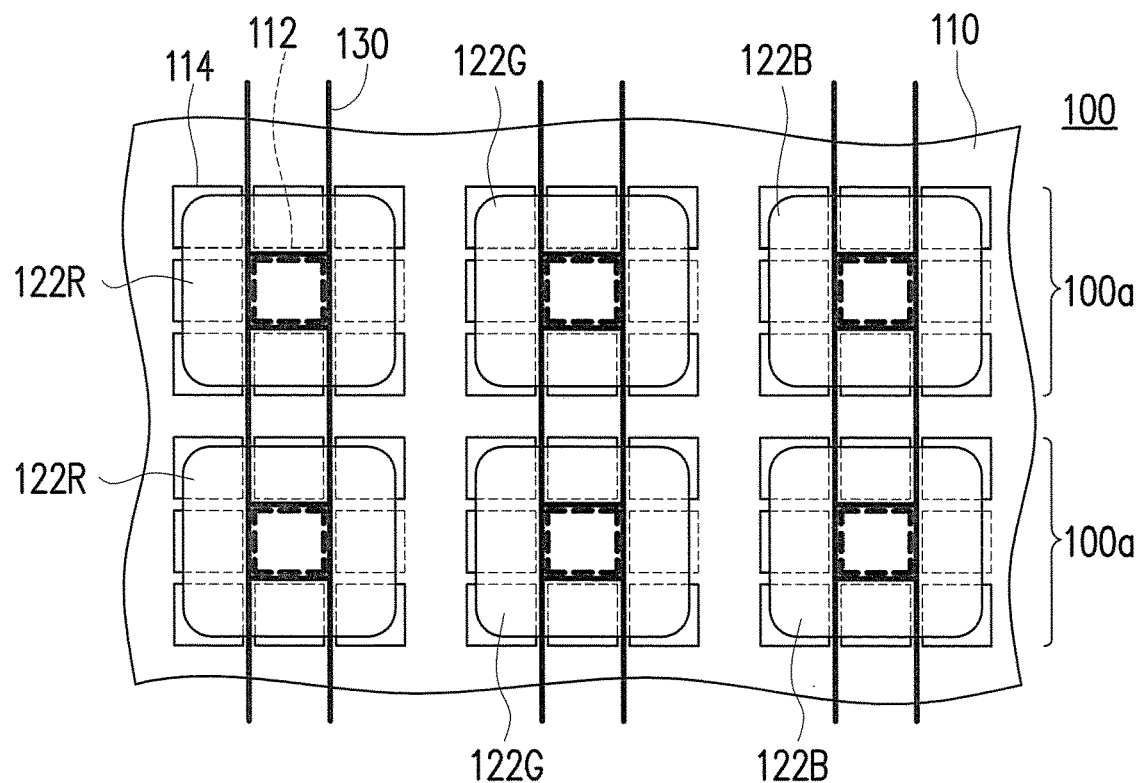
FIG. 2 is a top view of a portion of the three-dimensional display module of FIG. 1.

FIG. 1 is a cross-sectional schematic of a portion of the three-dimensional display module of an embodiment of the disclosure. FIG. 2 is a top view of a portion of the three-dimensional display module of FIG. 1. Referring to FIG. 1 and FIG. 2, a three-dimensional display module 100 of the present embodiment is, for instance, an augmented-reality heads-up display and includes a substrate 110, a display layer 120, a first electrode layer 130, a liquid-crystal layer 140, a second electrode layer 150, and a drive unit 160. The substrate 110 has a protective layer 115, a plurality of first electrodes 112, and a plurality of second electrodes 114, and the protective layer 115 covers the second electrodes 114 and partially exposes each of the first electrodes 112. The display layer 120 is disposed on the substrate 110 and located between the substrate 110 and the liquid-crystal layer 140 and includes a plurality of light-emitting elements 122R, 122G, and 122B and an under-fill 124.

It should be mentioned that, to make the figures clearer, FIG. 1 only shows a partial cross-section corresponding to a single light-emitting element 122R, FIG. 2 only shows ta partial region corresponding to the plurality of light-emitting elements 122R, 122G, and 122B, and the under-fill 124, the liquid-crystal layer 140, and the second electrode layer 150 in FIG. 1 are not shown in FIG. 2.

In the present embodiment, the light-emitting elements 122 are, for instance, micro light-emitting diode (LED) elements or micro laser diode (LD) elements, and the conductive bumps 116 shown in FIG. 1 are respectively connected to the first electrodes 112. The under-fill 124 is filled between the light-emitting elements 122R, 122G, and 122B, the conductive bumps 116, and the substrate 110. The first electrode layer 130 is disposed on the display layer 120 and connected to the light-emitting elements 122R, 122G, and 122B. The liquid-crystal layer 140 is disposed on the display layer 120 and covers the first electrode layer 130. The second electrode layer 150 is disposed on the liquid-crystal layer 140 such that the liquid-crystal layer 140 is located between the first electrode layer 130 and the second electrode layer 150. The first electrode layer 130 of the present embodiment is, for instance, a metal mesh layer and does not block the light emitted by the light-emitting elements 122R, 122G, and 122B. However, the disclosure is not limited thereto, and the first electrode layer 130 can also be an indium tin oxide (ITO) electrode film and is transparent. Moreover, the second electrode layer 150 of the present embodiment is, for instance, a transparent cover having an ITO electrode film or other suitable types of transparent electrode layers, and the disclosure is not limited thereto.

The drive unit 160 is, for instance, a driver circuit and is adapted to drive each of the first electrodes 112 and the first electrode layer 130 to provide power to each of the light-emitting elements 122R, 122G, and 122B such that the light-emitting elements 122R, 122G, and 122B emit light passing through the liquid-crystal layer 140 to form a display image. In each of the light-emitting elements 122R, 122G, and 122B, the first electrode layer 130 and the first electrodes 112 are, for instance, respectively used as a positive electrode and a negative electrode. The drive unit 160 drives each of the second electrodes 114 and the second electrode layer 150 to produce an electric field at the liquid-crystal layer 140 to change the molecular arrangement of the liquid crystals in the liquid-crystal layer 140, and the focal length of the liquid-crystal layer 140 is changed correspondingly so as to control the depth of field of the display image. In the liquid-crystal layer 140, the second electrode layer 150 and the second electrodes 114 are, for instance, respectively used as a positive electrode and a negative electrode to produce the electric field.

In the present embodiment, the display layer 120 producing the display image and the light-emitting elements 122R, 122G, and 122B thereof and the liquid-crystal layer 140 adjusting the depth of field of the display screen are all supported by the substrate 110 such that the display layer 120 and the liquid-crystal layer 140 are integrated in the three-dimensional display module 100 as an integrated structure. In addition to driving the light-emitting elements 122R, 122G, and 122B to emit light to produce the display image, the drive unit 160 of the three-dimensional display module 100 can also drive the liquid-crystal layer 140 to change the focal length thereof to rapidly and accurately control the depth of field of the display image for effective labeling under the constantly changing traffic conditions while driving.

Specifically, the three-dimensional display module 100 of the present embodiment has a plurality of pixel regions 100a (labeled in FIG. 2), and the light-emitting elements include a plurality of first color (such as red) light-emitting elements 122R, a plurality of second color (such as green) light-emitting elements 122G, and a plurality of third color (such as blue) light-emitting elements 122B, and each of the pixel regions 100a corresponds to one of the first color light-emitting elements 122R, one of the second color light-emitting elements 122G, and one of the third color light-emitting elements 122B. The three-dimensional display module 100 can control the light-emitting elements 122R, 122G, and 122B of each of the pixel regions 100a to emit light or not emit light so as to form the image to be displayed via all of the plurality of pixel regions 100a.

In the present embodiment, the three-dimensional display module 100, for instance, projects the display image to the windshield in front of the driver such that the virtual image of the display image is located in the environment in front of the driver to form a label corresponding to the environment. Accordingly, the drive unit 160 of the present embodiment can make the focal length of the liquid-crystal layer 140 in a portion of the pixel region 100a different from the focal length of the liquid-crystal layer 140 in another portion of the pixel region 100a via the electric field to make the depth of field of the virtual image of the display image in the portion of the pixel region 100a different from the depth of field of the virtual image of the display image in the other portion of the pixel region 100a. Accordingly, virtual images having different depths of field can respectively be generated instantly in regions of different distances in the environment in front of the driver to achieve the display effect of augmented reality. That is, the three-dimensional display module 100 of the present embodiment can provide display images having different depths of field at different moments and different display regions with the change in the environment in front of the driver while driving a transport vehicle (such as a car).

Referring to FIG. 1, the orthographic projection of the first electrode layer 130 of the present embodiment on the second electrode layer 150 is not overlapped with the orthographic projection of the second electrode 114 on the second electrode layer 150. Accordingly, interference to the electric field between the second electrode 114 and the second electrode layer 150 by the first electrode layer 130 can be prevented. Moreover, in addition to covering one of the first electrodes 112, each of the light-emitting elements 122R, 122G, and 122B of the present embodiment also covers a plurality of second electrodes 114 such that the light-emitting element 122R, 122G, and 122B have higher coverage on the substrate 110.

Figure 3:
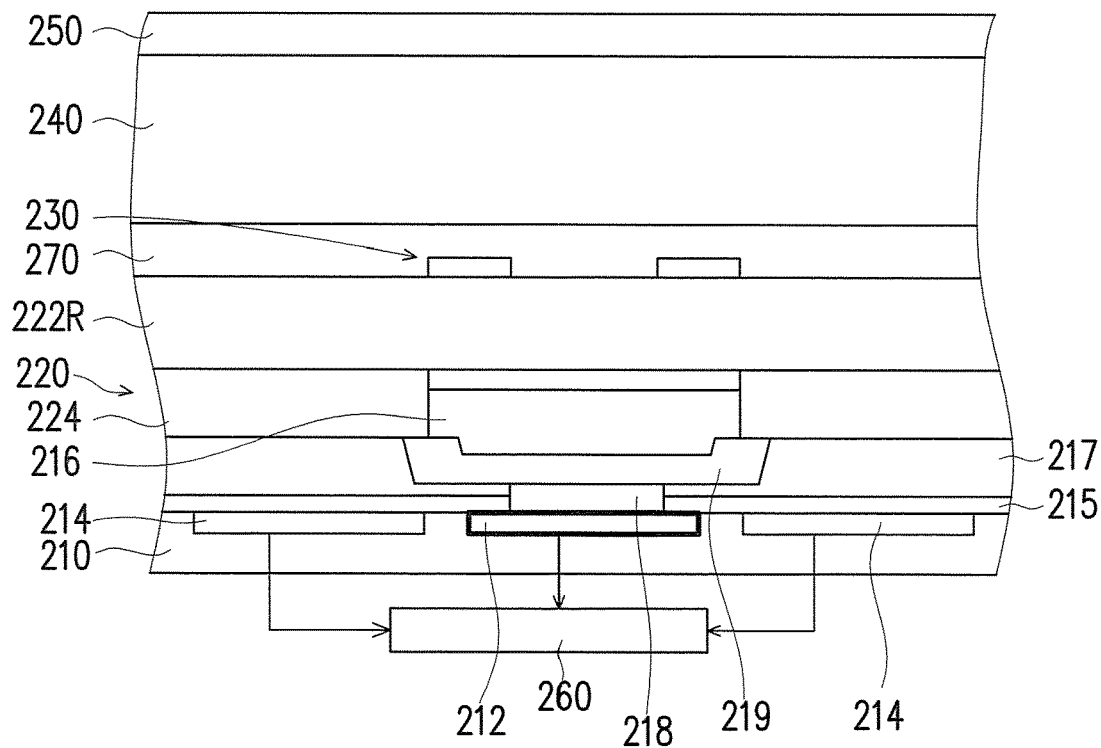
FIG. 3 is a cross-sectional schematic of a portion of the three-dimensional display module of another embodiment of the disclosure.

FIG. 3 is a cross-sectional schematic of a portion of the three-dimensional display module of another embodiment of the disclosure. In a three-dimensional display module 200 of FIG. 3, the configurations and functions of a substrate 210, first electrodes 212, second electrodes 214, conductive bumps 216, a protective layer 215, a display layer 220, light-emitting elements 222R, an under-fill 224, a first electrode layer 230, a liquid-crystal layer 240, a second electrode layer 250, and a drive unit 260 are similar to the configurations and functions of the substrate 110, the first electrodes 112, the second electrodes 114, the conductive bumps 116, the protective layer 115, the display layer 120, the light-emitting elements 122R, the under-fill 124, the first electrode layer 130, the liquid-crystal layer 140, the second electrode layer 150, and the drive unit 160 of FIG. 1 and are not repeated herein. The difference between the three-dimensional display module 200 and the three-dimensional display module 100 is that the first electrodes 212 and the conductive bumps 216 are further connected via conductive vias 218 and an under-bump metal (UBM) 219. Moreover, a transparent substrate 270 is disposed between the liquid-crystal layer 240 and the display layer 230 to fix the liquid-crystal layer 240 between the transparent substrate 270 and the second electrode layer 250 in a stable manner, wherein the transparent substrate 270 is, for instance, a glass substrate. Moreover, an insulating layer 217 may be disposed between the under-fill 224 and the protective layer 215.

Figure 4:
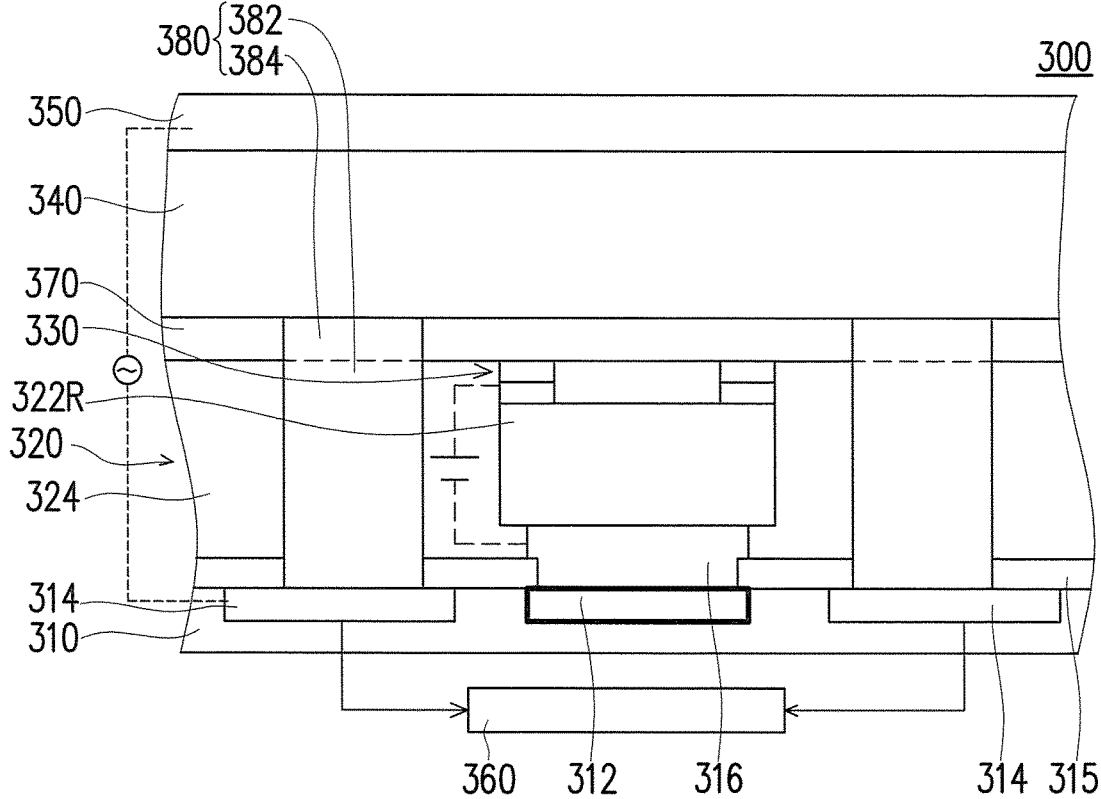
FIG. 4 is a cross-sectional schematic of a portion of the three-dimensional display module of another embodiment of the disclosure.

FIG. 4 is a cross-sectional schematic of a portion of the three-dimensional display module of another embodiment of the disclosure. In a three-dimensional display module 300 of FIG. 4, the configurations and functions of a substrate 310, first electrodes 312, second electrodes 314, conductive bumps 316, a protective layer 315, a display layer 320, light-emitting elements 322R, an under-fill 324, a first electrode layer 330, a liquid-crystal layer 340, a second electrode layer 350, and a drive unit 360 are similar to the configurations and functions of the substrate 110, the first electrodes 112, the second electrodes 114, the conductive bumps 116, the protective layer 115, the display layer 120, the light-emitting elements 122R, the under-fill 124, the first electrode layer 130, the liquid-crystal layer 140, the second electrode layer 150, and the drive unit 160 of FIG. 1 and are not repeated herein. The difference between the three-dimensional display module 300 and the three-dimensional display module 100 is that the three-dimensional display module 300 further includes a plurality of conductive structures 380, and the conductive structures 380 are respectively connected to the second electrodes 214 and pass through the under-fill 324 of the display layer 320 to be extended toward the liquid-crystal layer 340. Since the conductive structures 380 and the second electrode layer 350 have a shorter distance, a stronger electric field can be produced between the two to more effectively control the focal length of the liquid-crystal layer 340.

Moreover, a transparent substrate 370 is disposed between the liquid-crystal layer 340 and the display layer 320 to fix the liquid-crystal layer 340 between the transparent substrate 370 and the second electrode layer 350 in a stable manner, wherein the transparent substrate 370 is, for instance, a glass substrate. In addition to passing through the under-fill 324 of the display layer 320, the conductive structures 380 can also pass through the transparent substrate 370 as shown in FIG. 4. More specifically, the segment of the conductive structures 380 in the display layer 320 is, for instance, a conductive layer 382, and the segment of the conductive structures 380 in the transparent substrate 370 is, for instance, a through-silicon via (TSV), but the disclosure is not limited thereto. Moreover, since the conductive structures 380 are disposed above the second electrodes 314, the light-emitting elements 322R do not cover the second electrodes 314, and the light-emitting elements 322R are arranged alternately with the conductive structures 380.

Figure 5:
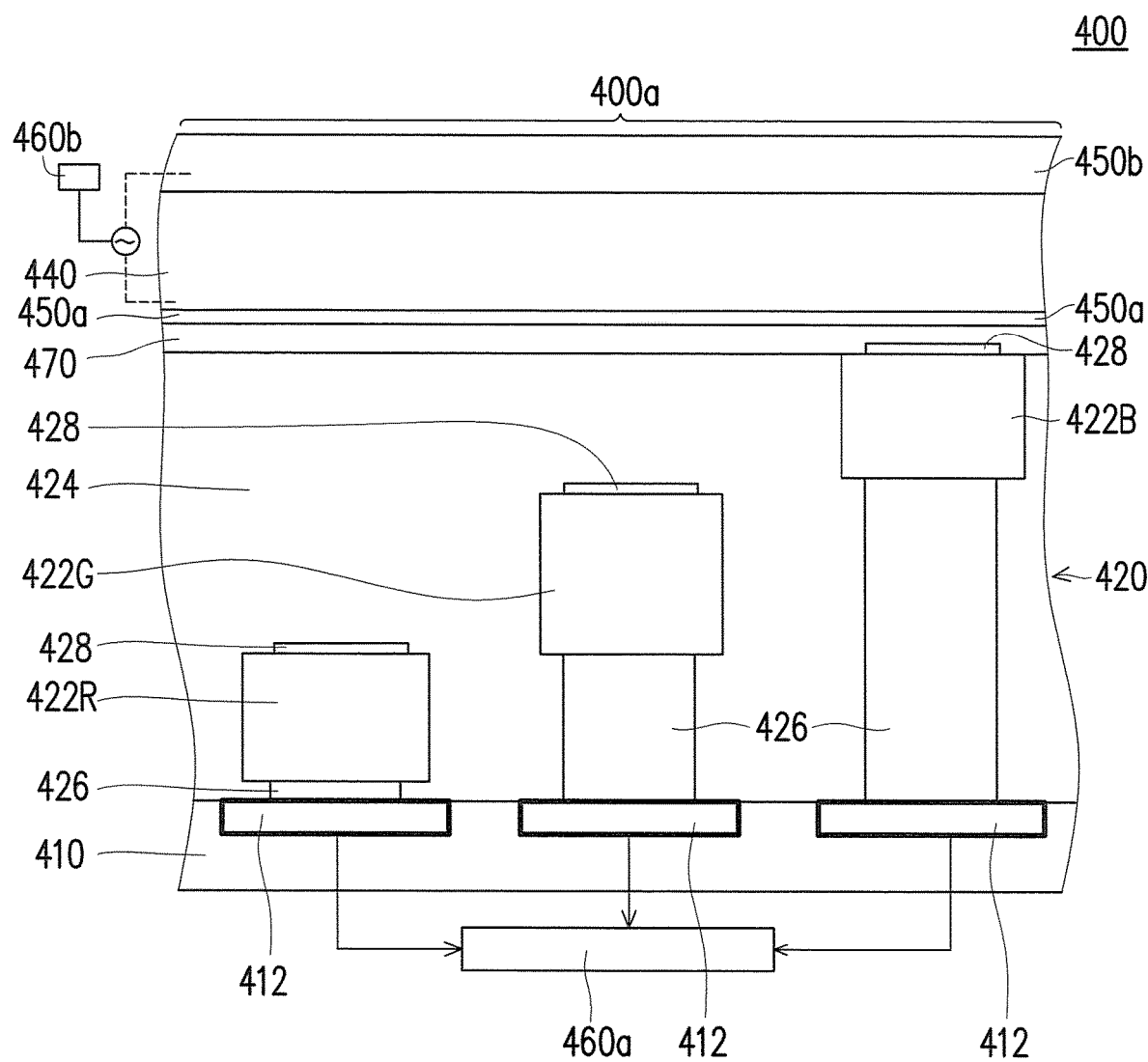
FIG. 5 is a cross-sectional schematic of a portion of the three-dimensional display module of another embodiment of the disclosure.

FIG. 5 is a cross-sectional schematic of a portion of the three-dimensional display module of another embodiment of the disclosure. Referring to FIG. 5, a three-dimensional display module 400 of the present embodiment includes a substrate 410, a display layer 420, a liquid-crystal layer 440, a first electrode layer 450a, a second electrode layer 450b, a drive unit 460a, a drive unit 460b, and a transparent substrate 470. The display layer 420 includes a plurality of light-emitting elements 422R, 422G, and 422B and includes an under-fill 424 and a plurality of conductive structures 426. It should be mentioned that, to make the figures clearer, FIG. 5 only shows a partial cross-section corresponding to three of the light-emitting elements 422R, 422G, and 422B.

The substrate 410 has a plurality of first electrodes 412, the conductive structures 426 (such as conductive bumps) are disposed on the substrate 110 and are respectively connected to the first electrodes 412, and the conductive structures 426 respectively have different heights in the direction perpendicular to the substrate 410 (i.e., the direction in which each of the conductive structures 426 is extended from the substrate 410 to the liquid-crystal layer 440). The light-emitting elements 422R, 422G, and 422B are, for instance, micro light-emitting diode (LED) elements or micro laser diode (LD) elements and are respectively disposed on the conductive structures 426 and are respectively connected to the first electrodes 412 via the conductive structures 426. Each of the light-emitting elements 422R, 422G, and 422B has a second electrode 428 thereon. The under-fill 424 is filled between the light-emitting elements 422R, 422G, and 422B, the conductive structures 426, and the substrate 410.

The first electrode layer 450a is disposed on the display layer 420. The liquid-crystal layer 440 is disposed above the light-emitting elements 422R, 422G, and 422B, and specifically, the liquid-crystal layer 440 of the present embodiment is disposed on the first electrode layer 450a and separated from the display layer 420 as shown in FIG. 5. The second electrode layer 450 is disposed on the liquid-crystal layer 440 such that the liquid-crystal layer 440 is located between the first electrode layer 450a and the second electrode layer 450b. Moreover, the second electrode layer 450 of the present embodiment is, for instance, a transparent cover having an ITO electrode film or other suitable types of transparent electrode layers, and the disclosure is not limited thereto. Moreover, a transparent substrate 470 is disposed between the liquid-crystal layer 440 and the display layer 420 to fix the liquid-crystal layer 440 between the transparent substrate 470 and the second electrode layer 450b in a stable manner, wherein the transparent substrate 470 is, for instance, a glass substrate.

The drive unit 460a is, for instance, a driver circuit and is adapted to drive each of the first electrodes 412 and each of the second electrodes 428 to provide power to each of the light-emitting elements 422R, 422G, and 422B such that the light-emitting elements 422R, 422G, and 422B emit light passing through the liquid-crystal layer 440 to form a display image. In each of the light-emitting elements 422R, 422G, and 422B, each of the first electrodes 412 and each of the second electrodes 428 are, for instance, respectively used as a positive electrode and a negative electrode. The other drive unit 460b is adapted to drive the first electrode layer 450a and the second electrode layer 450b to produce an electric field at the liquid-crystal layer 440 to change the molecular arrangement of the liquid crystals in the liquid-crystal layer 140, and the focal length of the liquid-crystal layer 440 is changed correspondingly so as to control the depth of field of the display image. In the liquid-crystal layer 440, the first electrode layer 450a and the second electrode layer 450b are, for instance, respectively used as a positive electrode and a negative electrode to produce the electric field.

In the present embodiment, the display layer 420 producing the display image and the light-emitting elements 422R, 422G, and 422B thereof, the conductive structures 426, and the liquid-crystal layer 440 adjusting the depth of field of the display screen are all supported by the substrate 410 such that the display layer 420 and the liquid-crystal layer 440 are integrated in the three-dimensional display module 400 as an integrated structure. In addition to driving the light-emitting elements 422R, 422G, and 422B to emit light to produce the display image via the drive unit 460a as described above, the three-dimensional display module 400 can also drive the liquid-crystal layer 440 to change the focal length thereof to rapidly and accurately control the depth of field of the display image for effective labeling under the constantly changing traffic conditions while driving. Moreover, since the conductive structures 426 respectively have different heights, when the conductive structures 426 are disposed on the substrate 410 in order, collision with the disposed conductive structures 426 can be prevented to increase process yield.

Specifically, the three-dimensional display module 400 of the present embodiment has a plurality of pixel regions 400a (one pixel region 400a is labeled in FIG. 5), and the light-emitting elements include a plurality of first color (such as red) light-emitting elements 422R, a plurality of second color (such as green) light-emitting elements 422G, and a plurality of third color (such as blue) light-emitting elements 422B, and each of the pixel regions 400a corresponds to one of the first color light-emitting elements 422R, one of the second color light-emitting elements 422G, and one of the third color light-emitting elements 422B. The three-dimensional display module 400 can control the light-emitting elements 422R, 422G, and 422B of each of the pixel regions 400a to emit light or not emit light so as to form the image to be displayed via all of the plurality of pixel regions 400a.

In the present embodiment, the three-dimensional display module 400, for instance, projects the display image to the windshield in front of the driver such that the virtual image of the display image is located in the environment in front of the driver to form a label corresponding to the environment. Accordingly, the drive unit 460b of the present embodiment can make the focal length of the liquid-crystal layer 440 in a portion of the pixel region 400a different from the focal length of the liquid-crystal layer 440 in another portion of the pixel region 400a via the electric field to make the depth of field of the virtual image of the display image in the portion of the pixel region 400a different from the depth of field of the virtual image of the display image in the other portion of the pixel region 400a. Accordingly, virtual images having different depths of field can respectively be generated instantly in regions of different distances in the environment in front of the driver to achieve the display effect of augmented reality. That is, the three-dimensional display module 400 of the present embodiment can provide display images having different depths of field at different moments and different display regions with the change in the environment in front of the driver while driving a transport vehicle (such as a car).

Figure 6:
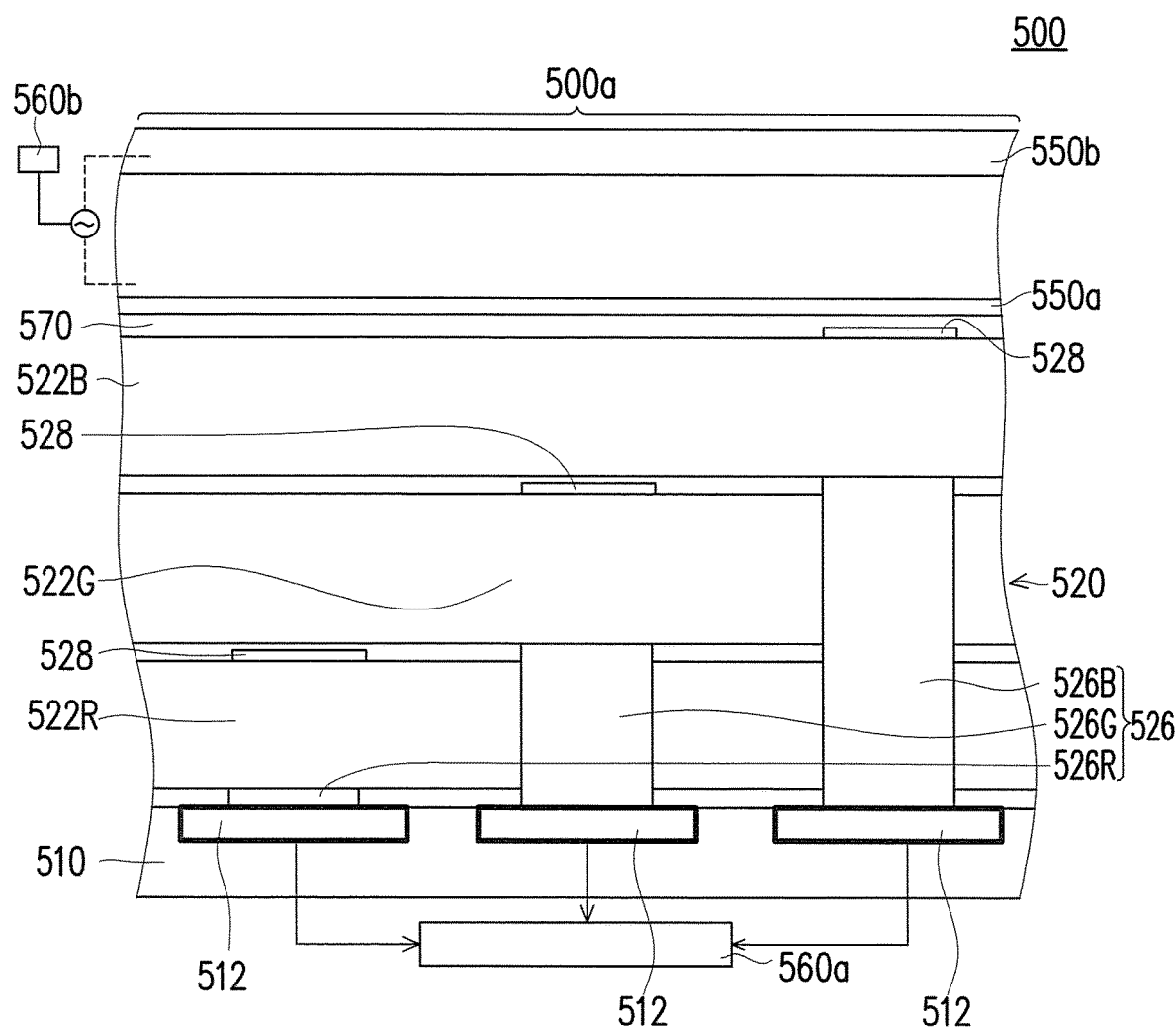
FIG. 6 is a cross-sectional schematic of a portion of the three-dimensional display module of another embodiment of the disclosure.

FIG. 6 is a cross-sectional schematic of a portion of the three-dimensional display module of another embodiment of the disclosure. In a three-dimensional display module 500 of FIG. 6, the configurations and functions of a substrate 510, first electrodes 512, second electrodes 528, conductive structures 526, a display layer 520, light-emitting elements 522R, 522G, and 522B, a first electrode layer 550a, a second electrode layer 550b, a liquid-crystal layer 540, drive units 560a and 560b, and a transparent substrate 570 are similar to the configurations and functions of the substrate 410, the first electrodes 412, the second electrodes 428, the conductive structures 426, the display layer 420, the light-emitting elements 422R, 422G, and 422B, the first electrode layer 450a, the second electrode layer 450b, the liquid-crystal layer 440, the drive units 460a and 460b, and the transparent substrate 470 of FIG. 5 and are not repeated herein. The difference between the three-dimensional display module 500 and the three-dimensional display module 400 is that in each of the pixel regions 500a, the first color light-emitting element 522R, the second color light-emitting element 522G, and the third color light-emitting element 522B are stacked on the substrate 510 in order, the conductive structure 526R is connected between the substrate 510 and the first color light-emitting element 522R, the conductive structure 526G passes through the first color light-emitting element 522R and is connected between the substrate 510 and the second color light-emitting element 522G, and the conductive structure 526B passes through the first color light-emitting element 522R and the second color light-emitting element 522G and is connected between the substrate 500 and the third color light-emitting element 522B. The first color light-emitting element 522R, the second color light-emitting element 522G, and the third color light-emitting element 522B are disposed in a stacking manner in order as described above such that each of the color light-emitting elements has higher coverage on the substrate 510 to increase display quality.

Figure 7:
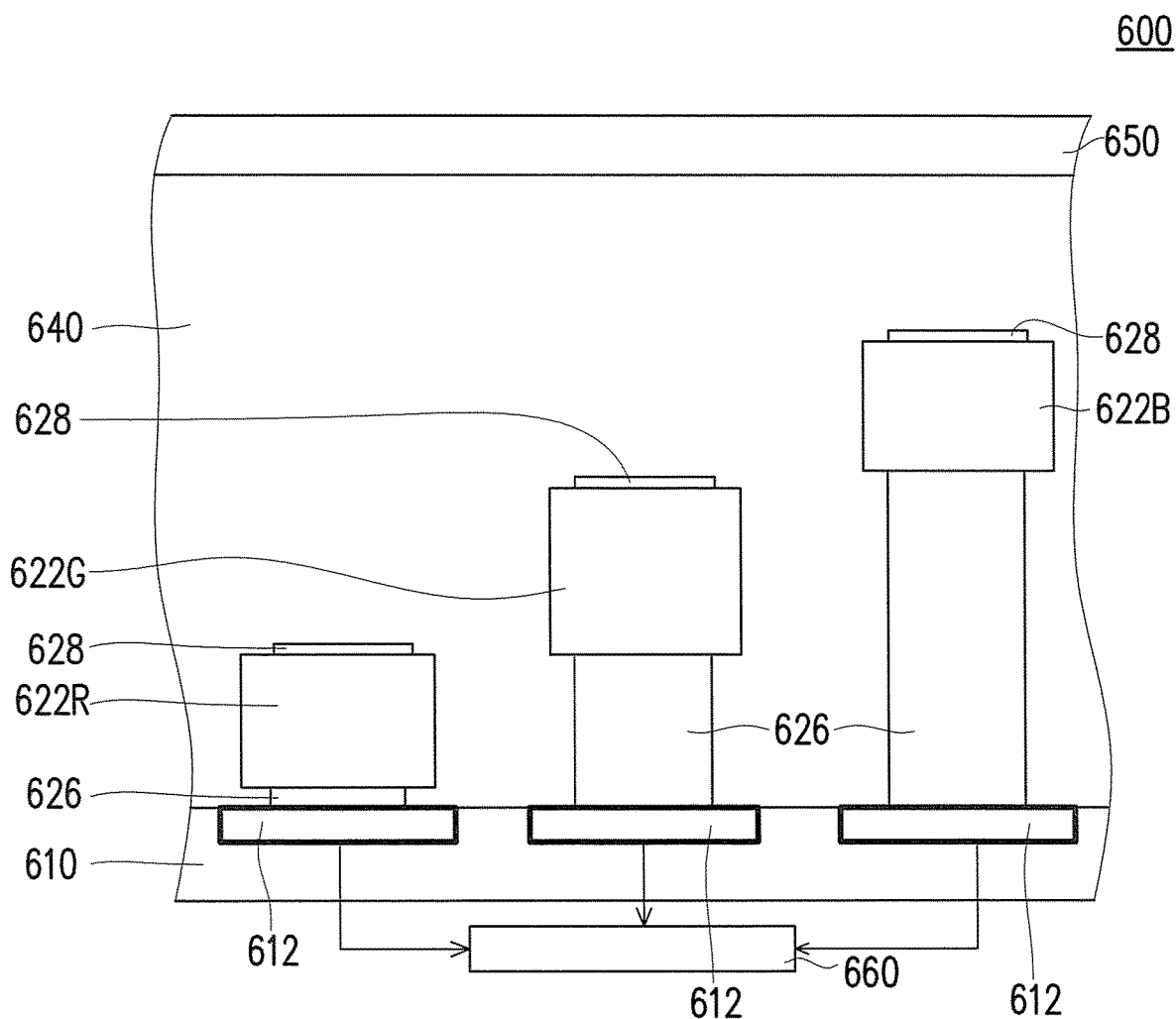
FIG. 7 is a cross-sectional schematic of a portion of the three-dimensional display module of another embodiment of the disclosure.

FIG. 7 is a cross-sectional schematic of a portion of the three-dimensional display module of another embodiment of the disclosure. In a three-dimensional display module 600 of FIG. 7, the configurations and functions of a substrate 610, first electrodes 612, conductive structures 626, light-emitting elements 622R, 622G, and 622B, an electrode layer 650, and a liquid-crystal layer 640 are similar to the configurations and functions of the substrate 410, the first electrodes 412, the conductive structures 426, the light-emitting elements 422R, 422G, and 422B, the electrode layer 450, and the liquid-crystal layer 440 of FIG. 5 and are not repeated herein. The difference between the three-dimensional display module 600 and the three-dimensional display module 400 is that the liquid-crystal layer 640 is disposed on the substrate 610 and covers the conductive structures 626 and the light-emitting elements 622R, 622G, and 622B, and each of the light-emitting elements 622R, 622G, and 622B has a second electrode 628. In addition to driving each of the first electrodes 626 and each of the second electrodes 628 to provide power to each of the light-emitting elements 622R, 622G, and 622B, a drive unit 660 further drives the second electrodes 628 and the electrode layer 650 to produce the electric field at the liquid-crystal layer 640.

Based on the above, in the disclosure, the plurality of light-emitting elements producing the display image and the liquid-crystal layer adjusting the depth of field of the display screen are integrated in the three-dimensional display module. In addition to driving the light-emitting elements to emit light to produce the display image, the drive unit of the three-dimensional display module can also drive the liquid-crystal layer to change the focal length thereof to rapidly and accurately control the depth of field of the display image for effective labeling under the constantly changing traffic conditions while driving. Moreover, the plurality of conductive structures connected between the plurality of light-emitting elements and the substrate can be disposed to respectively have different heights, and since the conductive structures respectively have different heights, collision to the disposed conductive structures can be prevented while disposing the conductive structures on the substrate in order to increase process yield. The three-dimensional display module of the disclosure may be applied to AR-HUD, but the disclosure is not limited thereto. For example, the three-dimensional display module of the disclosure may also be applied to three-dimensional display, three-dimensional projection or other three-dimensional visual apparatus.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional display module, comprising:
a substrate having a plurality of first electrodes and a plurality of second electrodes;
a display layer disposed on the substrate and comprising a plurality of light-emitting elements, wherein the light-emitting elements are respectively connected to the first electrodes;
a first electrode layer disposed on the display layer and connected to the light-emitting elements;
a liquid-crystal layer disposed on the display layer and covering the first electrode layer;
a second electrode layer disposed on the liquid-crystal layer; and
a drive unit, wherein the drive unit drives each of the first electrodes and the first electrode layer to provide a power to each of the light-emitting elements such that the light-emitting elements emit a light passing through the liquid-crystal layer to form a display image, and the drive unit drives each of the second electrodes and the second electrode layer to produce an electric field at the liquid-crystal layer to change a focal length of the liquid-crystal layer so as to control a depth of field of the display image.

2. The three-dimensional display module of claim 1, wherein the display layer and the liquid-crystal layer are both supported by the substrate.

3. The three-dimensional display module of claim 1, having a plurality of pixel regions, wherein each of the pixel regions corresponds to a first color light-emitting element, a second color light-emitting element, and a third color light-emitting element of the light-emitting elements.

4. The three-dimensional display module of claim 1, wherein an orthographic projection of the first electrode layer on the second electrode layer is not overlapped with an orthographic projection of the second electrodes on the second electrode layer.

5. The three-dimensional display module of claim 1, wherein each of the light-emitting elements covers one of the first electrodes and at least one of the second electrodes.

6. The three-dimensional display module of claim 1, comprising a plurality of conductive structures, wherein the conductive structures are respectively connected to the second electrodes and pass through the display layer to be extended toward the liquid-crystal layer.

7. The three-dimensional display module of claim 6, wherein the light-emitting elements and the conductive structures are arranged alternately.

8. The three-dimensional display module of claim 1, wherein the light-emitting elements are light-emitting diode elements or laser diode elements.

9. The three-dimensional display module of claim 1, wherein a virtual image of the display image is located in an environment and forms a label corresponding to the environment.

* * * * *